(12) United States Patent
Tobiason et al.

(10) Patent No.: US 8,085,295 B2
(45) Date of Patent: Dec. 27, 2011

(54) CONTROLLABLE MICRO LIGHT ASSEMBLY

(75) Inventors: Joseph D. Tobiason, Woodinville, WA (US); Paul G. Gladnick, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 1048 days.

(21) Appl. No.: 11/925,642

(22) Filed: Oct. 26, 2007

(65) Prior Publication Data

US 2009/0109285 A1 Apr. 30, 2009

(51) Int. Cl.
*H04N 7/18* (2006.01)
*G06K 9/42* (2006.01)

(52) U.S. Cl. .......... 348/79; 382/256; 382/154; 382/255; 382/294; 382/197; 362/554; 362/294; 362/157; 362/580; 362/84

(58) Field of Classification Search ............. 348/79
See application file for complete search history.

(56) References Cited

U.S. PATENT DOCUMENTS

| | | |
|---|---|---|
| 4,706,168 A | 11/1987 | Weisner |
| 4,852,985 A | 8/1989 | Fujihara |
| 4,911,532 A | 3/1990 | Hidaka |
| 5,482,896 A | 1/1996 | Tang |
| 5,580,163 A | 12/1996 | Johnson, II |
| 5,639,158 A | 6/1997 | Sato |
| 5,690,417 A | 11/1997 | Polidor |
| 5,880,889 A | 3/1999 | Neumann |
| 5,897,195 A | 4/1999 | Choate |
| 6,179,439 B1 | 1/2001 | Choate |
| 6,614,596 B2 | 9/2003 | Gladnick |
| 6,667,762 B1 | 12/2003 | Bouvier |
| 6,992,820 B2 | 1/2006 | Abe |
| 7,019,309 B2 | 3/2006 | Gu |
| 7,024,783 B2 | 4/2006 | Trull |
| 7,096,077 B2 | 8/2006 | Price |
| 7,324,682 B2 | 1/2008 | Wasserman |
| 2005/0031191 A1 | 2/2005 | Venkatachalam |
| 2006/0093205 A1 | 5/2006 | Bryll |
| 2008/0024793 A1 | 1/2008 | Gladnick |

OTHER PUBLICATIONS

"QVPAK 3D CNC Vision Measuring Machine Operation Guide," Sep. 1996.
"QVPAK 3D CNC Vision Measuring Machine User's Guide," Jan. 2003.

*Primary Examiner* — Jude Jean Gilles
(74) *Attorney, Agent, or Firm* — Christensen O'Connor Johnson Kindness PLLC (57) ABSTRACT

A micro light interface assembly for a microscopic machine vision inspection system includes a micro light assembly. The micro light assembly provides addressable light emitting elements arranged around the periphery of an aperture having an aperture dimension DAPMIN that is smaller than a barrel dimension DBAR of the inspection system objective lens. The aperture may be located along the optical axis and within the working distance of the objective lens such that the light emitting elements are closely arranged around a field of view. The micro light interface assembly may be held and operated through a connection element that may be used for the interchanging the micro light interface assembly with a touch probe, in some embodiments.

24 Claims, 9 Drawing Sheets

| Connection number | Function |
|---|---|
| 2 | |
| 3 | |
| 4 | |
| 5 | |
| 6 | |
| 7 | I²C CLK |
| 8 | GND |
| 1 | I²C DATA (Serial Digital Control) |
| 15 | |
| 9 | Probe ID |
| 10 | |
| 11 | Power |
| 12 | Probe ID Return |
| 13 | |
| 14 | |
| 16 | |

CONTROLLABLE MICRO LIGHT ASSEMBLY

FIELD OF THE INVENTION

The invention relates generally to metrology systems, and more particularly to a micro light assembly that may be utilized as part of a machine vision inspection system.

BACKGROUND

Precision machine vision inspection systems (or "vision systems" for short) can be utilized to obtain precise dimensional measurements of inspected objects and to inspect various other object characteristics. Such systems may include a computer, a camera and optical system, and a precision stage that is movable in multiple directions so as to allow the camera to scan the features of a workpiece that is being inspected. One exemplary prior art system that is commercially available is the QUICK VISION® series of PC-based vision systems and QVPAK® software available from Mitutoyo America Corporation (MAC), located in Aurora, Ill. The features and operation of the QUICK VISION® series of vision systems and the QVPAK® software are generally described, for example, in the *QVPAK 3D CNC Vision Measuring Machine User's Guide*, published January 2003, and the *QVPAK 3D CNC Vision Measuring Machine Operation Guide*, published September 1996, each of which is hereby incorporated by reference in their entirety. This product, as exemplified by the QV-302 Pro model, for example, is able to use a microscope-type optical system to provide images of a workpiece at various magnifications, and move the stage as necessary to traverse the workpiece surface beyond the limits of any single video image.

In such vision systems, a light source having a controllable illumination direction may enhance the observation and inspection of workpieces. Controllable light sources may project light onto the workpiece at an adjustable angle of incidence relative to an axis which is normal to the imaging plane, to image textured surfaces or edges with improved contrast, for example. Controllable light sources may also adjust the nominal azimuthal angle of lighting direction about the axis normal to imaging plane. Typically, the nominal azimuthal angle is adjustable or selectable using addressable sectors, such as quadrants or octants of the light source. Additionally, the intensity of the light source can be controlled.

Some controllable light sources are configured as multiple LEDs arranged in concentric annular circular or rectangular patterns, and may be subdivided into quadrants or controllable blocks. The LEDs may direct their light through a Fresnel or conventional lens to provide a desired angle of incidence. Some controllable light sources have fiber optic or other conventional sources that are arranged in quadrants or the like, and that are directed to roughly hemispherically-shaped reflectors that are mechanically adjusted to provide a desired angle of incidence. Examples of various known types of controllable light sources are included in U.S. Pat. Nos. 4,706,168; 6,179,439; 5,690,417; and 5,897,195, each of which is hereby incorporated by reference in its entirety. However, known controllable light sources have various shortcomings. For example, lights sources which use mechanical adjustments typically have a slow adjustment response time that may limit the throughput of a vision system configured to acquire dozens of images without stopping the motion of the vision system at each feature, but rather by freezing each image using strobe illumination. In contrast, known controllable lights sources which change the angle of incidence by addressing LED's have a fast response time, but have a relatively large size in order to accommodate the number of LEDs that provide the desired number of illumination directions and the desired illumination intensity. Such devices typically extend in various directions beyond the objective lens of the vision system, interfering with the positioning of some workpieces. The spacing between the individual LED sources and the field of view is also typically relatively large (tens of millimeters) in such devices. Thus, the $1/r^2$ drop in illumination intensity from the source limits the illumination intensity at the field of view, which extends the required exposure time for an image, limiting the throughput of a vision system that uses strobe illumination, for example. An improved controllable light source that overcomes these and other disadvantages, either individually or in combination, would be desirable.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention is directed to a miniature controllable light source configuration that overcomes the foregoing and other disadvantages. More specifically, the present invention is directed to a micro light interface assembly that provides a micro light assembly that is of particular utility for providing illumination while performing precision dimensional metrology using a general purpose machine vision inspection system that includes a microscope-type optical system.

A microscopic machine vision inspection system may comprise an imaging system including an objective lens that has a barrel outer dimension DBAR approximately perpendicular to its optical axis and working distance WD between an end of its barrel and a plane of best focus. According to one aspect of the invention, the machine vision inspection system may further comprise a connection element that mechanically receives and holds a micro light interface assembly according to this invention, and electrically connects to the micro light interface assembly. The micro light interface assembly may generally comprise a micro light assembly portion that provides a plurality of addressable light emitting elements arranged around the periphery of an image light transmission aperture (e.g., a hole or transparent opening through a substrate) having a minimum aperture dimension DAPMIN that is smaller than the barrel outer dimension DBAR of the objective lens. The micro light interface assembly may be received and held using the connection element. The connection element may provide both mechanical and electrical interface features corresponding to mating features on the micro light interface assembly. Due to its unprecedented small size, the micro light assembly may be positioned with its image light transmission aperture (also referred to simply as an aperture herein) located along the optical axis and within the working distance WD such that at least some of the plurality of addressable light emitting elements are arranged in close proximity to a field of view of the imaging system at its plane of best focus. For example, at least some of the plurality of addressable light emitting elements may be positioned within a first volume defined by an intersection between the working distance WD and a projection of a cross-section of the objective lens barrel along the direction of the optical axis. The micro light assembly may be controlled such that at least one respective addressable light emitting element that is located within the first volume is selected and operated to illuminate the field of view along at least one of a corresponding respective angle of incidence relative to the optical axis and a corresponding respective azimuthal angle about the optical axis.

In various embodiments, the micro light assembly may be configured and positioned such that a plurality of the addressable light emitting elements are located within the first volume and at most 0.75 WD, or 0.5 WD, or even less, away from the plane of best focus of the imaging system. In various other embodiments, the micro light assembly may be configured and positioned such that a plurality of the addressable light emitting elements are located within the first volume and at most 5 millimeters, or 3 millimeters, or even less, away from the plane of best focus of the imaging system, regardless of the value of the dimension WD.

In various embodiments, the image light transmission aperture may have a small dimension, to facilitate locating the addressable light emitting elements as close as is practical to the field of view. The image light transmission aperture may be not only smaller than the outer dimension DBAR described above, but also smaller than an analogous outer dimension DLENS of a lens element included in the barrel of the objective lens. In some embodiments, the minimum aperture dimension DAPMIN may be at most at most 10 millimeters, or 6 millimeters, or even 3 millimeters or less. In various embodiments, all of the image light transmission aperture may be located within the first volume described above, or within a second smaller volume contained within the first volume and bounded by a projection of the dimension DLENS along the direction of the optical axis.

In accordance with one aspect of the invention, the micro light assembly may be extremely small and lightweight. It may be very thin (e.g., as thin as 3 millimeters, or less) and/or small, such that it may be inserted into (or mounted or positioned proximate to) small working distances between an objective lens and a field of view (FOV) on a workpiece surface that is to be imaged. It will be appreciated that by being able to position the light emitting elements very close to the FOV, the $1/r^2$ intensity drop off between the light emitting elements and the FOV is minimized. In certain embodiments, the distance r in between the light source and the workpiece may be a factor of 5, 10, 50 or more smaller than the known macro ring light systems, leading to associated illumination intensity gains of 25×, 100×, or 2500× or more in the FOV, for a given light source power level. Advantages provided by such gains in image illumination intensity include allowing higher magnifications to be used on low reflectance parts, and/or faster strobe exposure times, for example. Another advantage is that unconventional types of illumination sources, which would not provide sufficient image illumination intensity in a macro ring light system, may be used. For example, in some embodiments, the addressable light emitting elements may comprise organic LEDs (OLEDs), or electroluminescent elements, which may offer certain cost and size advantages. Another advantage is that the small size is less likely to interfere with the positioning of workpieces in the field of view, and the small mass allows faster acceleration/deceleration of an element that carries the micro ring light. Thus, the mechanical response time for moving the micro light assembly may be very fast.

In various embodiments, the micro light assembly may comprise an illumination array (e.g., an array of LEDs) that is addressable, such that activating particular elements of the illumination array as light emitting elements provides illumination of the FOV from a particular angle of incidence and/or azimuthal angle. In some embodiments, respective light emitting elements may emit respective wavelengths or colors, which may be activated individually or in combination. In some embodiments, a Fresnel lens, an array of micro lenses, or a planar diffractive optical element may be positioned proximate to the illumination array to deflect and/or concentrate the light output from the various addressable light emitting elements toward the field of view of the imaging system. In some embodiments, such light concentrating elements may also at least partially determine the nominal angle of incidence, and/or nominal azimuthal angle, of the illumination provided by a particular light emitting element.

In some embodiments, the micro light assembly may comprise an illumination array, or an electroluminescent sheet, or a diffuse planar source, that is masked by a controllable spatial light modulator such that activating particular elements of the spatial light modulator provides illumination of the FOV from a particular angle of incidence and/or azimuthal angle. In some embodiments, the spatial light modulator may include and/or surround an aperture through which the objective lens may image the surface of a workpiece.

In accordance with another aspect of the invention, in various embodiments, the connection element that receives and holds the micro light interface assembly according to this invention may comprise an autojoint connection used with a touch probe head. The micro light interface assembly may be interchangeably mounted to and powered by a touch probe head that is used in conjunction with a microscopic machine vision inspection system. That is, when a touch probe is not in use, interchangeable micro light interface assemblies may be picked up and micro light assembly manipulated into desired positions relative to an objective lens and/or FOV on a workpiece surface using the touch probe head and its associated motion system. Thus, a micro light interface assembly according to this invention allows significant new abilities and utility to be derived from standard touch probe control techniques already used in conjunction with some machine vision inspection system applications. In some embodiments, known touch probe control techniques may provide for up to 6 degrees of freedom of the motion usable to manipulate a micro ring light according to this invention, relative to a microscope objective lens and/or FOV. This allows a micro light assembly according to this invention to be precisely and flexibly positioned very close to the FOV on a workpiece that is being inspected, and/or a micro light interface assembly to be automatically exchanged with another that is more suited for a particular lens or a particular workpiece feature in the FOV, for example. The touch probe head may change the position and/or angle of the micro light assembly at a very high speed, due to its small mass.

In some embodiments, the micro light interface assembly may include a miniature or micro mechanical adjustment element that may assist in adjusting angle of incidence and/or azimuthal angle provided by the micro light assembly. Due to the miniature dimensions of the micro light assembly and its close proximity to the FOV, relatively large angular adjustments may be provided by relatively small mechanical motions. Thus, the adjustment response time of such mechanical adjustment elements may be much faster than that obtainable in known controllable light sources using mechanical adjustment elements.

In various embodiments, the micro light assembly may be configured as a micro ring light that provides controllable illumination from a plurality of addressable light emitting elements distributed around at least 180, or 270, degrees of azimuthal angle, or more.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
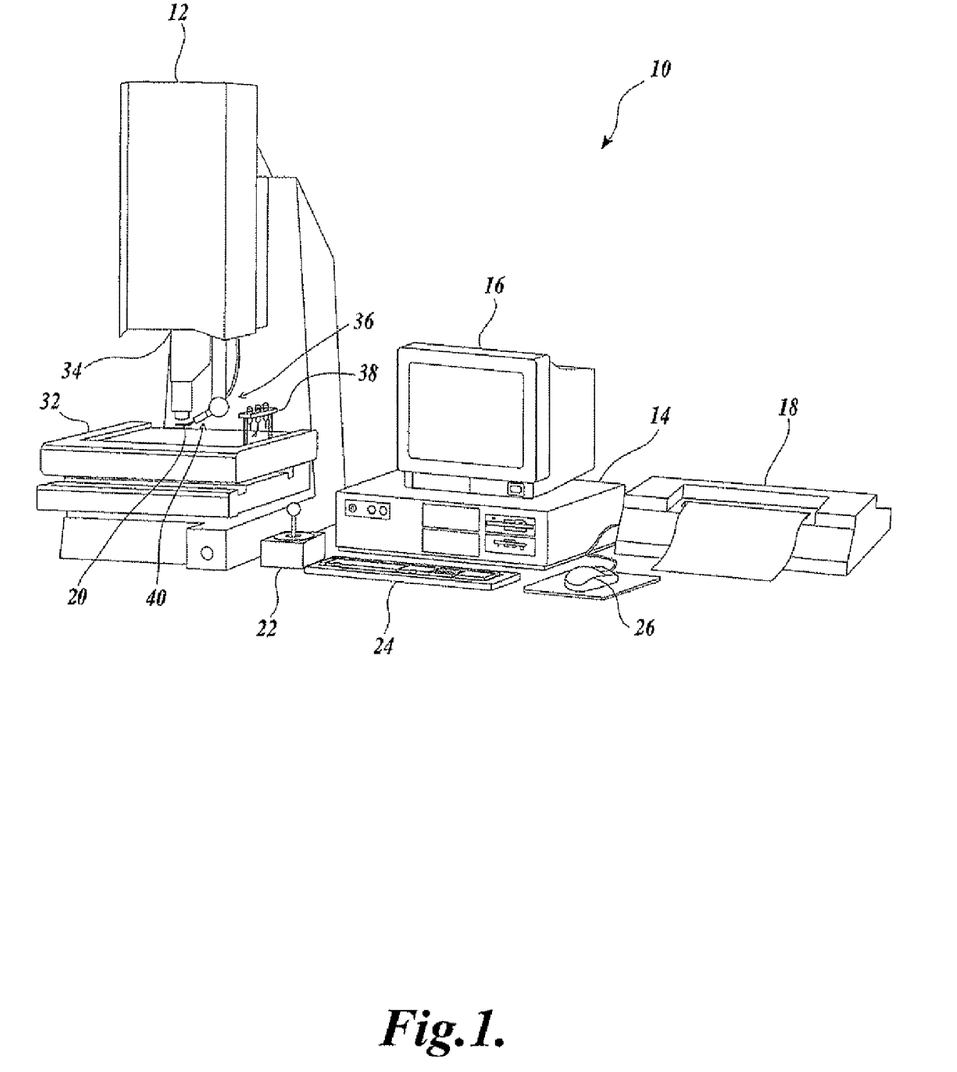
FIG. 1 is a diagram of a microscopic-type precision machine vision and inspection system including a micro light assembly according to this invention.

FIG. 1 is a block diagram of an exemplary microscopic-type machine vision inspection system 10 including one embodiment a micro light assembly according to this invention. The machine vision inspection system 10 includes a vision measuring machine 12 that is operably connected to exchange data and control signals with a controlling computer system 14. The controlling computer system 14 is further operably connected to exchange data and control signals with a monitor or display 16, a printer 18, a joystick 22, a keyboard 24, and a mouse 26. The monitor or display 16 may display a user interface suitable for controlling and/or programming the operations of the machine vision inspection system 10.

The vision measuring machine 12 includes a moveable workpiece stage 32 and an optical imaging system 34 which may include a zoom lens or interchangeable lenses. The zoom lens or interchangeable lenses generally provide various magnifications for the images provided by the optical imaging system 34. The machine vision inspection system 10 is also described in copending and commonly assigned U.S. patent application Ser. No. 10/978,227, which is hereby incorporated by reference in its entirety. Various aspects of vision measuring machines and control systems are also described in more detail in copending and commonly assigned U.S. patent application Ser. Nos. 10/808,948, filed Mar. 25, 2004; and 10/632,823, filed Aug. 4, 2003, which are also hereby incorporated by reference in their entirety.

As described in more detail in the '948 and '823 applications, the machine vision inspection system 10 may include a control system portion which is usable to recall captured and stored workpiece inspection images, to inspect and analyze workpiece features in such workpiece inspection images, and to store and/or output the inspection results. These analysis and inspection methods are typically embodied in various video tools included in a video tool portion of a memory.

As will be described in more detail below with reference to FIG. 2, the machine vision inspection system 10 further includes a mechanical probe system 36 and a tool changing rack 38, and associated control software, approximately comparable to those available with the QUICK VISION® QV Apex series of vision systems available from Mitutoyo America Corporation (MAC), located in Aurora, Ill., and similar state-of-the-art commercially available precision machine vision inspection systems that include touch probes.

The probe system 36 may select various touch probes or other tools from the tool changing rack 38 to be used in conjunction with various measurement functions by the vision measuring machine 12. In accordance with one aspect of the present invention, one of the tools that may be selected from the tool changing rack 38 by the probe system 36 is micro light interface assembly 40 that includes a micro light assembly 20 according to this invention. In this configuration, standard coordinate measuring machine techniques may be utilized in conjunction with standard machine vision techniques to control the probe system 36 to automatically pick up the micro light interface assembly 40 and precisely position the micro light assembly 20 below an objective lens of the optical imaging system 34, and in close proximity to an FOV on a workpiece surface that is being inspected. Various micro light assembly embodiments usable in place of the micro light assembly 20 are described further below.

Figure 2:
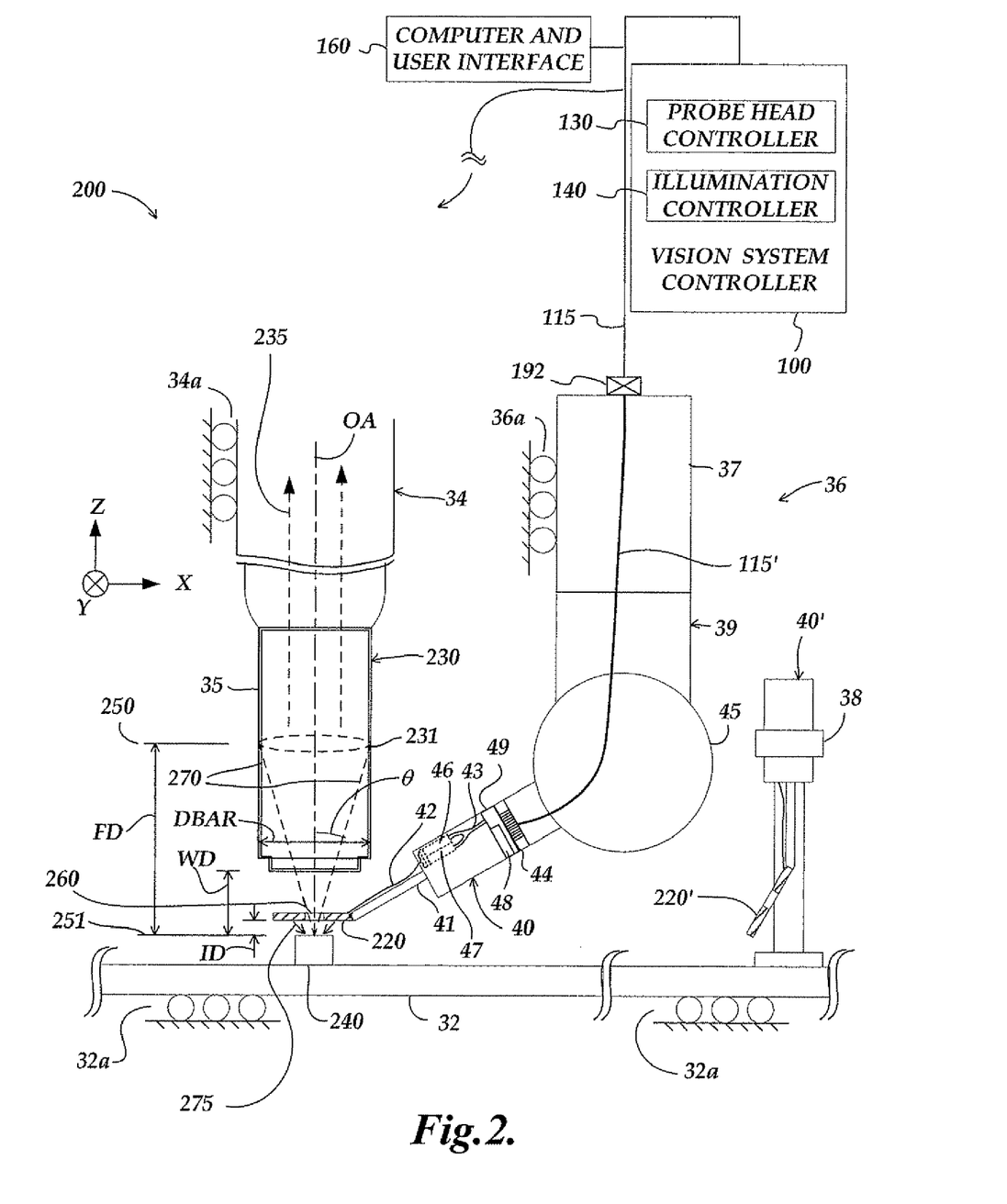
FIG. 2 is a diagram illustrating a first exemplary embodiment of a mounting and use arrangement for a micro light assembly according to this invention, on a microscopic-type machine vision and inspection system similar to that shown in FIG. 1.

FIG. 2 is a diagram illustrating a first exemplary embodiment of a mounting and use arrangement 200 for a micro light assembly 220 according to this invention, on a microscopic-type machine vision and inspection system similar to that shown in FIG. 1, including the optical imaging system 34 and a probe system 36. As shown in FIG. 2, the probe system 36 is movable along a Z axis guide bearing 36a, and includes a probe head mount 37 and a probe head assembly 39. The probe head assembly 39 includes a motorized head 45, which provides for rotation about its Z axis, and perpendicular to that axis. A micro light interface assembly 40 is mechanically coupled to the motorized head 45 through an autojoint connection 44, including electric connections as described below with reference to FIGS. 7 and 8. In one embodiment, the motorized head 45 and the autojoint connection 44 may be provided by one of the PH10 motorized head series described in Renishaw™ publication H-1000-5070-11-B, all available from Renishaw PLC, Gloucestershire, UK.

In the embodiment of the micro light interface assembly 40 shown in FIG. 2, a micro light interface circuit 49 is connected to the autojoint connection 44. The micro light interface circuit 49 may receive light control instructions or codes (e.g., serial codes) through a limited number of connections (e.g., as described in detail below with reference to FIGS. 7 and 8) and may include a decoder portion 48 which decodes the instructions or codes and provides the appropriate control signals to an included light control multiplexer 46 and an included power controller 47, through a power and control bus 43. Power from the power controller 47 is routed through the light control multiplexer 46 to selected ones of connecting wires 42 to provide the appropriate power to the appropriate elements of the micro light assembly 220. The micro light assembly 220 is joined to and supported by a support member 41 of the micro light interface assembly 40.

The micro light interface assembly 40 including the micro light assembly 220 is interchangeable under automatic or manual control and may be stored in the tool changing rack 38, which may be located on a controllable workpiece stage 32. The tool changing rack 38 may include alternate micro light interface assemblies 40' with different micro light assemblies 220', as well as conventional touch probes for use with the probe system 36. As will be described in more detail below, in operation, the micro light assembly 220 is positioned by the probe system 36 to be located below the optical imaging system 34 for illumination of the surface of a workpiece 240 that is being inspected, e.g., approximately as shown in FIG. 2.

The optical imaging system 34 uses the illumination 275 provided by the micro light assembly 220 to image the surface of the workpiece 240. In the embodiment shown in FIG. 2, the optical imaging system 34, which has an optical axis OA, may focus by moving along a Z axis guide bearing 34a, and includes an objective lens 230, having a lens barrel 35 which houses an internal lens elements 231 (schematically represented). The lens barrel 35 has barrel outer dimension DBAR approximately perpendicular to its optical axis. The workpiece 240 is located in the FOV of the optical imaging system 34 on the workpiece stage 32, which is movable along X and Y axes on guide bearings 32a. The micro light assembly 220 includes an image light transmission aperture 260 through which the imaging system 34 is able to image the FOV on the workpiece 240. More specifically, illumination light 275 from the micro light assembly 220 is directed at a desired angle of incidence and/or azimuth toward the FOV on the workpiece 240, and the imaging system 34 images the FOV through the image light transmission aperture 260. The numerical aperture of the objective lens 230 determines the angle θ of the limiting rays 270 of the image light 235. Design considerations that may be related to the numerical aperture, the focal distance FD between an effective principle plane 250 and a best focus plane 251, the nominal working distance WD between the objective lens barrel 35 and the best focus plane 251, the barrel outer dimension DBAR, and an expected illumination distance ID between the bottom surface of the micro light assembly 220 and the best focus plane 251, for example, are shown and described further below with reference to FIG. 4. It will be appreciated that the micro light assembly 220 can be positioned in close proximity to the surface of the workpiece 240, such that sufficient illumination may be provided using very low power. In other words, the standard $1/r^2$ drop-off of intensity is minimized, due to the distance r between the light source and the surface of the workpiece being minimized.

FIG. 2 also shows control blocks representing exemplary control circuits and/or routines that may be included in a control system for a machine vision inspection system usable in conjunction with this invention. The blocks include a computer and user interface 160, and vision system controller 100, which may comprise an illumination controller 140 and a probe head controller 130, all interconnected to each other and to various components of the machine vision and inspection system by a power and control bus 115. The control bus 115 is shown connected to a probe head power and control cable 115' through a connection 192 in the embodiment in FIG. 2. In various embodiments, the computer and user interface 160 allows a user to interact with the machine vision and inspection system (and/or the vision system controller 100) to operate, control, and program its various elements. It may also store workpiece programs and the like. The vision system controller 100 may be used to control and synchronize the operations of various portions of the machine vision and inspection system such that it may be operated to perform various inspection operations, which may include motion control, image acquisition and storage, and image processing operations, and the like. The probe head controller 130 may perform operations that control and synchronize the operations of the probe system 36, which may include local motion control, probe identification, touch signal processing, and the like. The illumination controller 140 may perform operations that control and synchronize the operations of a micro light interface assembly according to this invention, which may include control of the selection of individually addressable lighting elements and the associated power levels for each, and the like. It may also control additional types of light sources as described in the incorporated references (not shown). In various embodiments, the operations which encode the illumination control signals that are sent to the micro light interface assembly 40 according to this invention may be performed in the probe head controller 130, or elsewhere in the vision system controller 100 or in a computer included with the computer and user interface 160. In general, the various blocks outlined above may be configured using components and operations that are similar or identical to those used to similar operations in the prior art. For example, the prior art includes commercial systems and devices (e.g., those referred to specifically herein), and the incorporated references, and the like. It will be appreciated that in various embodiments, the operations of the blocks outlined above may be carried out using general purpose processors or the like, and that in various embodiments the circuits and/or routines associated with various blocks may be merged or indistinguishable.

Figure 3:
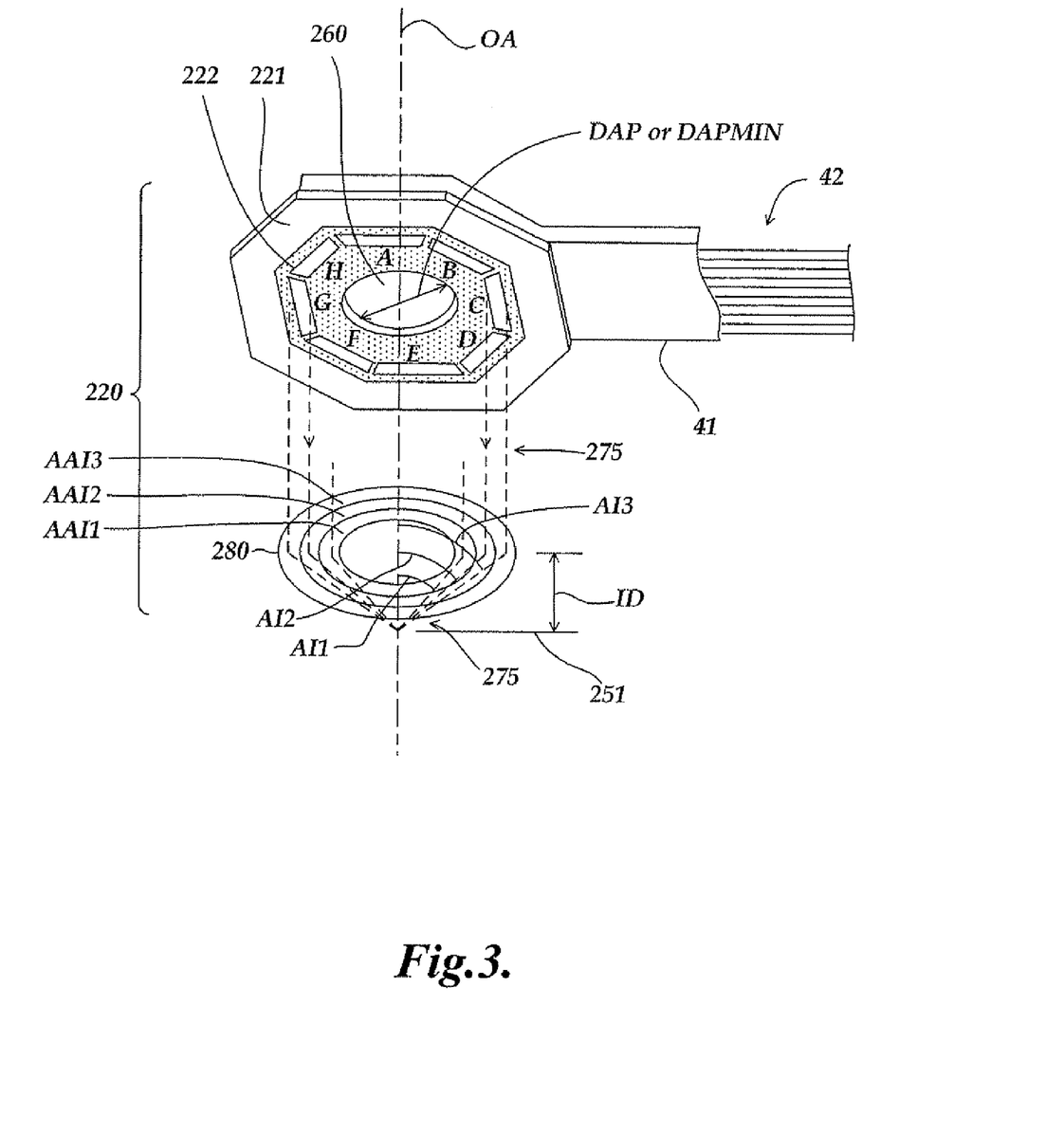
FIG. 3 is a diagram of a detailed exploded view of a portion of an exemplary embodiment of the micro light assembly of FIG. 2.

FIG. 3 is a diagram of a detailed exploded view of one exemplary embodiment of the micro light assembly 220 of FIG. 2. In the embodiment shown in FIG. 2, the micro light assembly 220 includes an array substrate 221, an illumination array 222, an image light transmission aperture 260 and a Fresnel lens 280. Fresnel lens 280 is shown in an exploded view, but it will be appreciated that the Fresnel lens 280 is located proximate to or approximately abutting the illumination array 222 in various embodiments. The array substrate 221 is attached at the end of the support member 41, and includes addressable individual light emitting elements A-H, which are representative of a larger (or smaller) number of analogous elements (not shown) that provide illumination at corresponding angles of incidence and azimuth. The individual light emitting elements may be individually powered from a corresponding one of the connecting wires 42. In the embodiment shown in FIG. 3, the Fresnel lens 280 has an optical axis OA (which may coincide with the optical axis OA of the objective lens 230 of FIG. 2) and may provide illumination at an desired number of angles of incidence (e.g., the angles AI1, AI2, AI3), depending on the location of a light emitting element relative to the Fresnel lens 280. For example, according to known principles, the respective angles of incidence AI1, AI2, AI3 approximately correspond to the portions of the illumination light 275 that pass through the respective annular regions AAI1, AAI2, and AAI3 of the Fresnel lens 280. An illumination distance ID represents an expected separation between the Fresnel lens 280 and the best focus plane 251 (e.g., corresponding to the focused surface of the workpiece 240 as shown in FIG. 2). During operation, illumination light 275 from the illumination array 222 is directed through the Fresnel lens 280 toward the FOV at the best focus plane 251, and the FOV is then imaged through the image light transmission aperture 260 by the imaging system 34.

In various embodiments, the individually addressable light emitting elements A-H and the like may comprise LEDs such as interconnected X-Y-arranged or circularly arranged pixel-like LEDs, or customized extended curves, lines or patches that act in concert (e.g., a quadrant arc at a certain diameter). The individually addressable light emitting elements may comprise different numbers of LED pixels (e.g., 1, 2, 4 etc.) if desired, and may be extremely compact. In various embodiments, such individually addressable elements may include LED pixels of a uniform wavelength, or of a combination of wavelengths (e.g., so as to provide colored or white light). In other embodiments, the illumination array 222 may be a fully addressable LED pixel array or the like, so as to provide for illumination at flexible combinations of solid-angles (incidence angle and azimuthal angle ranges). In various embodiments, LED or OLED elements, or the like, may have a dimension on the order of 0.25 millimeters and may located on a PCB substrate at a pitch of approximately 0.45 millimeters along both radial and circumferential directions about a location where the optical axis is expected to pass through the image light transmission aperture 260 during operation. In such a case, a large number of addressable light emitting elements may be distributed over an azimuthal angle range of 360 degrees, and a range of angles of incidence. The overall thickness of the micro light assembly 220 along the direction of the optical axis may be made as small as 3 millimeters, or less, in various embodiments. In various embodiments, at least four addressable light emitting elements may be arranged to emit light within a distance of 3 millimeters, or 2 millimeters, or less, from edge of the image light transmission aperture In some applications, it may be sufficient to provide a smaller number of addressable light emitting elements (e.g., 4 elements) distributed over 180 degrees, or 270 degrees of azimuthal angle at a single radial dimension, and this may be more economical. It should be appreciated that a single light emitting element located at a single radial may output diverging light in some embodiments. In such a case, it should be appreciated that by adjusting the illumination distance ID using a motion control system, it is possible to provide various effective angles of incidence between that light emitting element and the field of view.

It should be appreciated that the embodiment of the micro light interface assembly 40 and micro light assembly 220 described above are exemplary only and not limiting. In other embodiments, one or more micro light sources may be remotely located in the body of a micro light interface assembly to feed light through a number of optical fibers or optical waveguides in an individually addressable manner. The optical fibers or optical waveguides may be routed in place of the connecting wires 42, according to known methods, with their light emitting ends arranged to provide light emitting elements in a desired configuration on an array substrate similar to the array substrate 221.

In another embodiment, one of more light sources (e.g., different color sources) remotely located in the body of the micro light interface assembly may feed light through an optical fiber to a planar diffuser located similarly to the array substrate 221. An addressable spatial light modulator (e.g., a miniature LCD pixel array) may be located between the planar diffuser and a light concentrator and/or deflector such as a Fresnel lens or a micro lens array, to control the location of the light that reaches the Fresnel lens or micro lens array. Thus, the various respective controllable light paths through the spatial light modulator provide respective addressable light emitting elements. In one embodiment, the spatial light modulator 250 may be a commercially available spatial light modulator such as the Sony LCX017AL, available through Sony Corporation of America, New York, N.Y., or a similar device including customized LCD patterns. In such embodiments, the micro light interface assembly may include a commercially available compatible chip set for receiving control signals and outputting corresponding signals that control the spatial light modulator, as outlined U.S. patent application Ser. No. 11/494,972, which is hereby incorporated herein by reference in its entirety. In another embodiment, an electroluminescent sheet may be used in place of the planar diffuser, to generate the illumination light proximate to the spatial light modulator. In another embodiment, a plurality of individually addressable electroluminescent elements may be arranged in a desired pattern on an array substrate similar to the array substrate 221, and controlled in a manner similar to that outlined for individually addressable elements A-H above, to control the pattern of light that reaches the Fresnel lens or microlens array without using an LCD spatial light modulator.

It should be appreciated that unprecedented close illumination distances ID are enabled by the small dimensions of a micro light assembly according to this invention, and/or the manner in which it may be flexibly positioned and/or removed and replaced in a lens-specific manner and/or workpiece-specific manner according to this invention. Because of the very low $1/r^2$ intensity reduction associated with unprecedented close illumination distances ID, a controllable micro light assembly according to this invention can provide illumination in a novel and economical manner using previously impractical low power light generators, such as particularly economical and small LED arrays that use relatively few elements, or electroluminescent elements as outlined above, or the like. In addition to the fast illumination direction adjustment response time that can be achieved by the electronic addressing outlined above, in some embodiments, mechanical adjustment along the Z axis direction may also be used to alter the angle of incidence at a faster rate that prior art devices, because due to the unprecedented close illumination distances ID, smaller adjustment distances along the Z axis direction may provide the desired changes in the angle of incidence.

Figure 4:
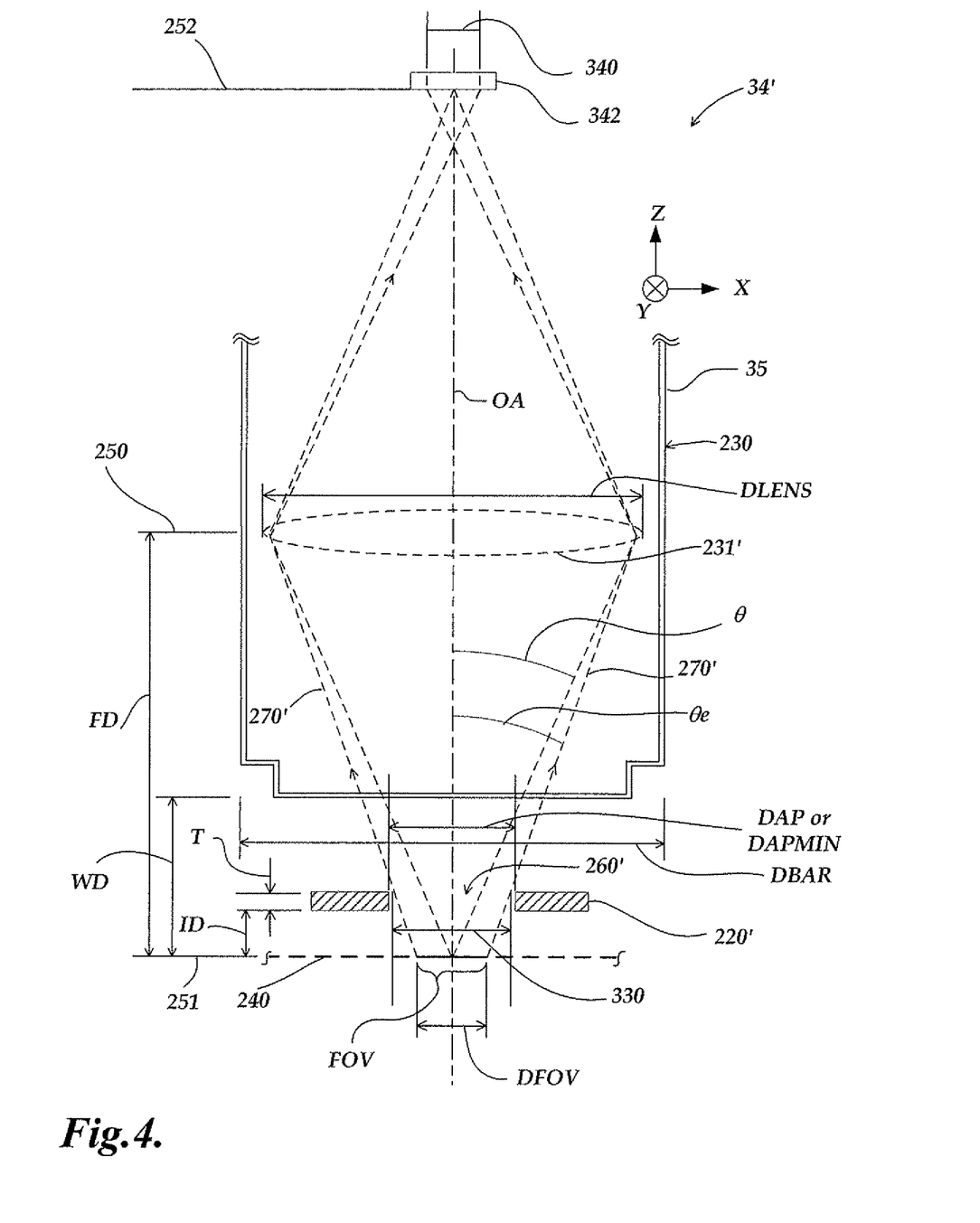
FIG. 4 is a diagram illustrating design considerations regarding the paths of certain light rays relative to one exemplary micro light assembly according to this invention and relative to an optical system of a machine vision inspection system.

FIG. 4 is a diagram illustrating various design considerations regarding the paths of certain light rays relative to an image light transmission aperture 260' or other imaging clearance path through a micro light assembly 220' according to this invention and relative to an imaging system 34' of a machine vision inspection system. In general, it is desirable for the aperture dimension DAP to be wide enough that the FOV that can be imaged by the objective lens 230 onto a camera 342, is unobstructed by the micro light assembly 220'. For an unobstructed image of the FOV, the extreme light rays 270' reflected from the edge of the FOV on the surface of the workpiece 240 must pass through the image light transmission aperture 260'. More specifically, in the example shown in FIG. 4, the aperture dimension DAP is made to be slightly larger than an extreme ray dimension 330, as outlined below. In some embodiments, the aperture 260' may not be circular. In such a case, a minimum dimension DAPMIN of the aperture 260', proximate to an expected location of the optical axis OA during operation, may fulfill the same conditions as those outlined here for the dimension DAP.

As shown in FIG. 4, an illumination distance ID is defined, which for the purposes of this analysis corresponds to the maximum illumination distance ID that is expected to be used with a particular micro light assembly 220'. The FOV has a dimension DFOV. The dimension T is approximately the thickness of the micro light assembly 220', that is, approximately the distance from its bottom surface to a top surface that needs to have clearance relative to the extreme light rays 270'. As shown in FIG. 4, the extreme light rays 270' form an angle θe with the optical axis OA that is generally less than the angle θ defined by the numerical aperture of the objective lens 230. Thus, in various embodiments, if the aperture dimension DAP satisfies the condition:

$$DAP \geq DFOV + (2*(ID+T)*\tan\theta) \qquad (Eq.\ 1)$$

then, provided that the image light transmission aperture 260' is concentric with the optical axis OA, the extreme light rays 270' will pass through the image light transmission aperture 260' at the illumination distance ID (or lesser illumination distances) with some clearance, as desired. It will be appreciated that the image light transmission aperture 260' may be filled with an optically transparent material, in various embodiments. That is, it may be a clear optical aperture rather than a hole. For example, it may include portions of a glass illumination array substrate, or transparent portions of an LCD spatial light modulator, or the like. However, in such a case, care must be taken that such transparent materials do not compromise the image quality of the imaging system 34'.

It should be appreciated based on the previous descriptions that, in various embodiments, the aperture dimension DAP (or DAPMIN) in a micro light assembly according to this invention may be less than the barrel outer dimension DBAR of the objective lens 230, and/or less than a lens outer dimension DLENS of an internal lens element 231' of the objective lens 230. It will be appreciated that by positioning a relatively small aperture 260' of a micro light assembly according to this invention along the optical axis of the objective lens 230 and within the working distance WD, a plurality of addressable light emitting elements may be arranged around the FOV of the imaging system, at a very small distance from the FOV, to provide various advantages outlined above. In various embodiments, at least some of the plurality of the addressable light emitting elements may be located within a first volume defined by the barrel outer dimension DBAR and the working distance WD, and/or within a second volume defined by the lens outer dimension DLENS and the working distance WD. In some embodiments, the dimension DAP (or DAPMIN) may be limited to be at most 0.75*DBAR (or 0.75*DLENS), and in various other embodiments DAP (or DAPMIN) may be limited to be at most 0.5*DBAR (or 0.5*DLENS), or less. In some embodiments, the aperture dimension DAP or the minimum aperture dimension DAPMIN may be at most at most 10 millimeters, or 6 millimeters, or even 3 millimeters or less, regardless of the value of the dimension DBAR (or DLENS). In some embodiments, all of the image light transmission aperture 260' may be located within the first (or second) volume described above. In various embodiments, a micro light assembly according to this invention may be configured and positioned such that a plurality of the addressable light emitting elements are located within the first volume and at most 0.75 WD, or 0.5 WD, or even less, away from the plane of best focus of the imaging system. In various other embodiments, the micro light assembly may be configured and positioned such that a plurality of the addressable light emitting elements are located within the first volume and at most 5 millimeters, or 3 millimeters, or even less, away from the plane of best focus of the imaging system, regardless of the value of the dimension WD. Thus, in various embodiments, some or all of the plurality of the addressable light emitting elements may be located exceedingly close to the FOV and operated at very low powers level, while still providing FOV illumination intensities exceeding that provided by prior art controllable direction illumination systems.

It should also be appreciated that although the foregoing embodiments generally describe a micro light assembly that includes a circular aperture and that provides a controllable illumination from plurality of addressable light emitting elements distributed evenly around approximately 360 degrees of azimuthal angle, such embodiments are exemplary only, and not limiting. As one example, in one alternative embodiment, a rectangular or square aperture may be used. In another alternative embodiment, with certain workpieces, it may be advantageous for a micro light assembly to comprise an array substrate configured to include C-shape, or U-shape image light transmission aperture or the like. In such a case, the image light transmission aperture may have an incomplete or "unclosed" periphery or boundary (e.g., the aperture periphery may have the shape of a C- or a U-, or the like). For an aperture having a non-circular closed boundary, or an incomplete aperture boundary, for purposes of characterizing of DAPMIN, DAPMIN may be taken as the diameter of an inscribed circle that is fit to a non-circular closed aperture boundary or an incomplete aperture boundary. In various alternative embodiments, the center of such an inscribed circle may be a good approximation of a generally expected location of the optical axis during operation. Thus, in various embodiments, when the minimum aperture dimension DAPMIN is characterized in this way, it may generally be advantageous for any aperture to have a minimum aperture dimension DAPMIN that is less than the barrel outer dimension DBAR, or that is otherwise limited as previously outlined for the dimensions DAP and/or DAPMIN, and/or that satisfies the conditions of the dimension DAP in EQUATION 1.

In many embodiments, it may also be advantageous for a maximum aperture dimension DAPMAX to be less than the barrel outer dimension DBAR and/or DLENS. In some embodiments, the dimension DAPMAX may be limited to be at most 0.75*DBAR (or 0.75*DLENS), and in various other embodiments DAPMAX may be limited to be at most 0.5*DBAR (or 0.5*DLENS), or less. For a closed aperture boundary, DAPMAX is the maximum dimension between boundary portions. For an incomplete aperture boundary, for purposes of characterizing DAPMAX, the effective extents of an aperture may be defined for embodiments including incomplete apertures by assuming that the aperture periphery, in effect, bridges across the incomplete portion of the periphery to connect portions of the aperture periphery that are bordered by an adjacent light emitting element. Thus, the maximum aperture dimension DAPMAX may be defined in such cases to extend between the most widely separated portions of the aperture periphery that are bordered by an adjacent light emitting element. It will be appreciated that since there are no light emitting elements along the incomplete portion of an incomplete aperture boundary, there are no light emitting elements which might suffer by being located far from the FOV, and therefore the incomplete portion of the aperture is largely irrelevant for determining the maximum aperture dimension DAPMAX.

In one exemplary embodiment, the imaging numerical aperture may be on the order of 0.14 (θ≈8 degrees), sin θe may be on the order of 0.10 (θe≈5.7 degrees), the dimension ID may be on the order of 1-2 mm, T may be on the order of 1-2 mm, and DFOV may be on the order of 3.2 mm. Thus, in such an embodiment the dimension DAP (or DAPMIN) may be on the order of 3.6-4.0 mm. The overall dimension across the micro light assembly 220' (e.g., the lighting array substrate, etc., may be on the order of 10 mm, in order to provide an angle of incidence adjustment range on the order of 35 to 75 degrees. A two-level lighting array substrate (e.g., two circuit boards abutting one another) may be used to locate lighting elements that provide a large angle of incidence range, in some embodiments. It will be appreciated that the various dimensions and configurations indicated above are exemplary only, and not limiting.

Figure 5:
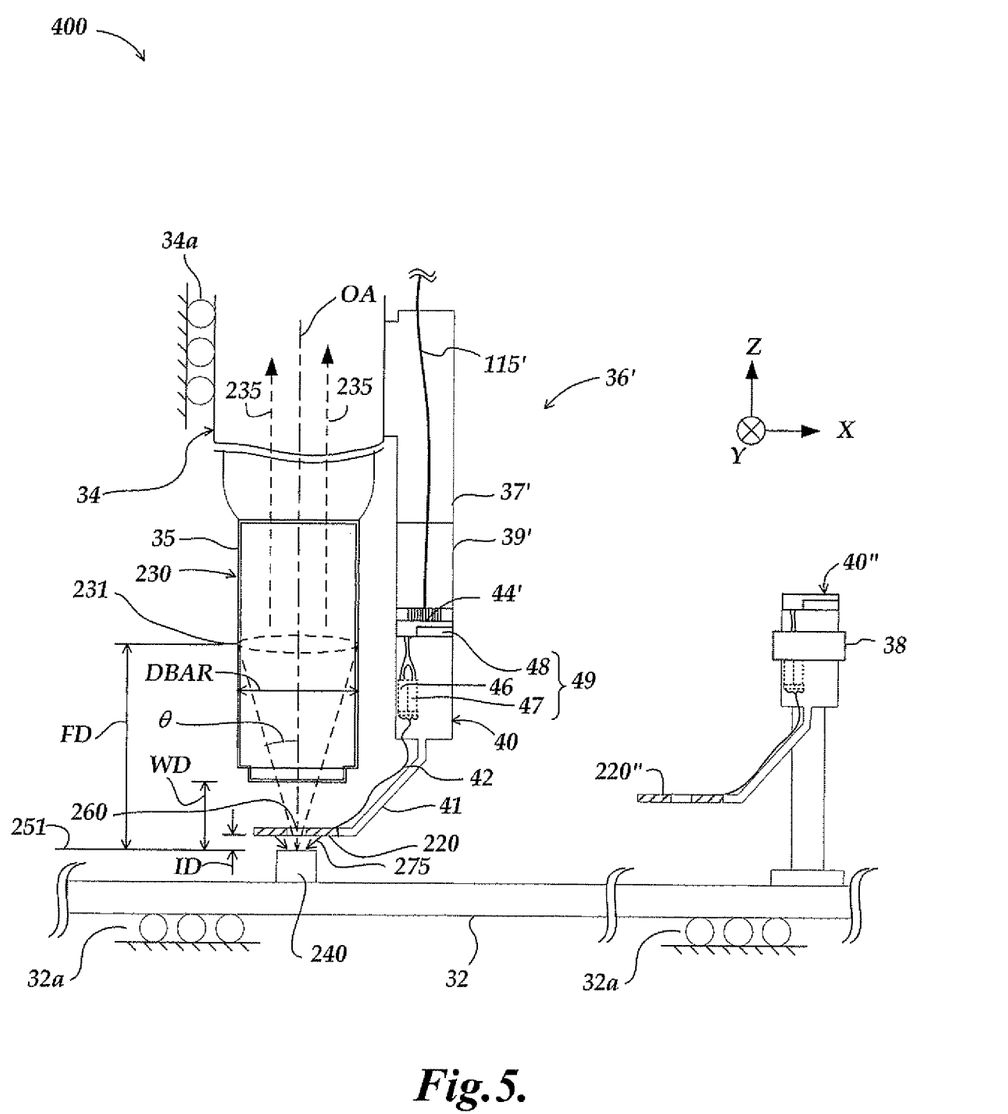
FIG. 5 is a diagram illustrating a second exemplary embodiment of a mounting and use arrangement for a micro light assembly according to this invention on a microscopic-type machine vision and inspection system similar to that shown in FIG. 1.

FIG. 5 is a diagram illustrating a second exemplary embodiment of a mounting and use arrangement 400 for a micro light assembly according to this invention, on a microscopic-type machine vision and inspection system similar to that shown in FIG. 1, including the optical imaging system 34 and a simpler probe system 36'. Various elements of the mounting and use arrangement 400 are numbered similarly to elements of the mounting and use arrangement 200 shown in FIG. 2, and similarly numbered elements may be similar or identical, unless otherwise indicated below by description or context. The primary difference is that the mounting and use arrangement 400 includes a probe system 36' that includes fewer controllable degrees of freedom in comparison to the probe system 36 of the mounting and use arrangement 200. In particular, the probe head mount 37' of the probe system 36' is rigidly attached to the frame of the optical imaging system 34, and in one embodiment the probe head assembly 39' includes a non-motorized head and the autojoint connection 44', which may be provided by one of the PH6 head series available from Renishaw PLC, Gloucestershire, UK. One advantage of the mounting and use arrangement 200 is that it is more economical. One disadvantage of the mounting and use arrangement 200 is that the position of the micro light interface assembly 40, including the micro light assembly 220, cannot be adjusted along the Z axis relative to the objective lens 230. Thus, in order to accommodate the different numerical apertures, working distances WD, and FOV dimensions associated with different objective lenses, a different micro light interface assembly 40" having slightly different physical dimensions and/or a different illumination distance ID (as provided by a different Fresnel lens, for example), may have to be provided when the objective lens 230 is changed.

Figure 6:
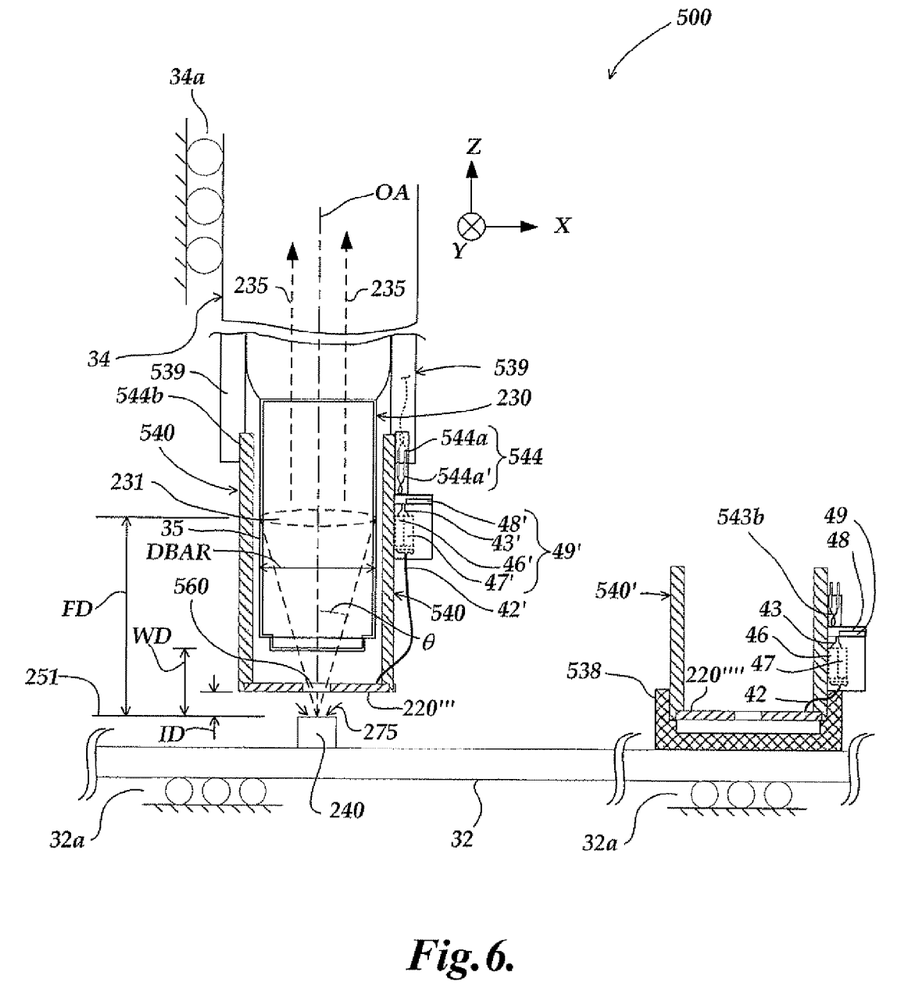
FIG. 6 is a diagram illustrating a third exemplary embodiment of a mounting and use arrangement for a micro light assembly according to this invention.

FIG. 6 is a diagram illustrating a third exemplary embodiment of a mounting and use arrangement 500 for a micro light assembly according to this invention on a microscopic-type machine vision and inspection system similar to that shown in FIG. 1, except no probe system is included. Various elements of the mounting and use arrangement 500 are numbered similarly to elements of the mounting and use arrangement 200 shown in FIG. 2, and similarly numbered elements may be similar or identical, unless otherwise indicated below by description or context. The primary difference is that the mounting and use arrangement 500 includes no probe system. Rather, a micro light interface assembly 540, including a micro light assembly 220", interfaces directly to a customized micro ring light connection joint 539 that is mounted rigidly relative to the imaging system 34, such that the micro light interface assembly 540 is rigidly mounted proximate to the FOV of the imaging system 34 (e.g., proximate to or partially surrounding the barrel 35 of the objective lens 230, as illustrated in FIG. 6).

In the embodiment shown in FIG. 6, the micro light interface assembly 540 may be mechanically different from, but electrically similar or identical to, the micro light interface assembly 40, outlined previously. The micro ring light connection joint 539 may include an autojoint-type connection 544 (schematically represented) that includes mechanical interface features 544b (e.g., magnets and kinematic mount features similar to those used in the autojoint 44) and appropriate electrical connections 544a, which have mating features on the micro light interface assembly 540, including the electrical connections 544b. The "primed" elements 42', 43', 46', 47', 48', 49', and 220" may all be operated in a manner analogous to that previously outlined for the corresponding "unprimed" elements 42, 43, 46, 47, 48, 49, and 220, shown in FIG. 2. The micro light interface assembly 540 may include a body forming all or part of a cylinder and the micro light assembly 220" may be configured to be assembled to the end of that body, approximately as shown in FIG. 6.

The micro light interface assembly 540 including the micro light assembly 220" is interchangeable under automatic control, and may be automatically stored in or removed from a tool changing rack 538, which is located on the controllable workpiece stage 32. To do so, the controllable workpiece stage 32 may be used to position the tool changing rack 538 approximately along the optical axis OA in the proper alignment with the micro ring light connection joint 539, and the imaging system 34 may then be moved along the Z axis until the micro light interface assembly 540 is engaged or disengaged with the tool rack 538, according to techniques known from commercially available touch probe tool racks, or the like. In embodiments where the micro light interface assembly 540 is not adjustable, to accommodate the different numerical apertures, FOV dimensions, etc., associated with different objective lenses, the tool rack 538 may carry a different micro light interface assembly 540' having slightly different physical dimensions and/or a different illumination distance for use with a different objective lens.

In some embodiments the micro light interface assembly 540 may include a controllable adjustment feature that changes a dimension along the Z axis direction (e.g., a motorized feature similar to that used in a zoom lens), such that the spacing of the micro light assembly 220" relative to an objective lens, the nominal illumination distance ID, the angle of incidence range, or any combination of the three, may be adjusted. As previously indicated, this may be done very economically because the unprecedented close illumination distances ID achieved according to this invention allow small adjustments to achieve the desired effects.

Figure 7:
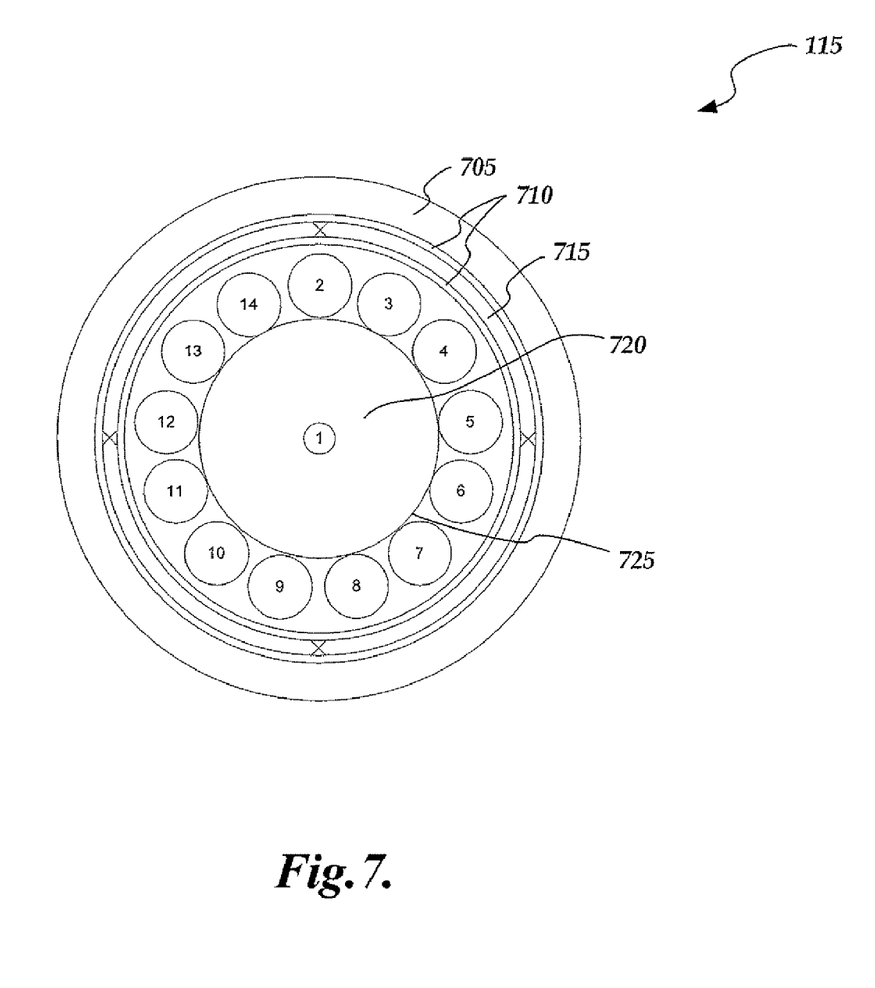
FIG. 7 is a diagram illustrating a cross section of one exemplary probe head data cable useable with a touch probe head.

FIG. 7 is a diagram illustrating a cross section of one exemplary probe data cable 115 useable with a probe head assembly, such as the a probe head assembly 39 shown in FIG. 2. As shown in FIG. 7, the cable 115 includes a sheath 705, sealing tape layers 710, an electrical shield layer 715 and a coaxial cable 720 including a central conductor "1" and a shield layer 725. Additional conductors 2 through 14 are shown as surrounding the coaxial cable 720, in accordance with a conventional Renishaw™ configuration, as will be described in more detail below with reference to FIG. 8.

Figure 8:
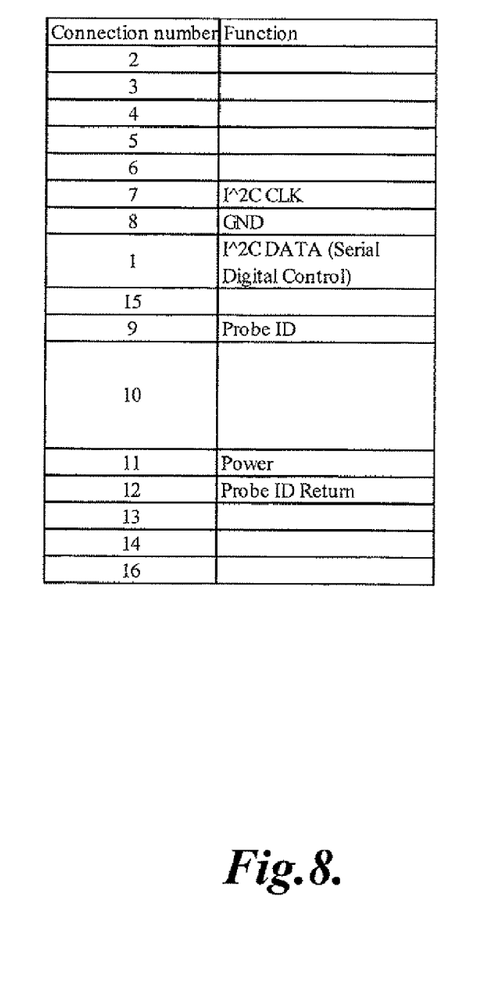
FIG. 8 is a table outlining one exemplary connection and/or signal scheme usable to connect a micro light assembly according to this invention to a touch probe head autojoint connection and the cable of FIG. 7.

FIG. 8 is a table outlining one exemplary connection and/or signal scheme usable to connect a micro light interface assembly according to this invention (e.g., the micro light interface assembly 40, or 540, respectively) at a connection joint (e.g., the connection at the autojoint 44, or the connection joint 539, respectively). In one embodiment, the connection numbers refer to spring loaded contact pin points of the autojoint 44, which may correspond to the conductors 2 through 14 of the cable 115, shown in FIG. 7. The connection numbers and corresponding signal types are compatible with one standard Renishaw™ autojoint wiring configuration.

In the embodiment shown in FIG. 8, the connection number 7 is designated as being for an I²C clock signal. The connection number 1 is designated as being for a data signal using an I²C serial data control. The I²C system, standing for Inter-Integrated Circuit, is a data transfer protocol developed by Royal Philips Electronics N.V. of Amsterdam, the Netherlands, utilizing a data signal and a clock signal. The connection number 8 is designated as being for a power ground return. The connection number 9 is designated as being for a probe identification signal. The connection number 12 is designated as being for a probe identification return signal. The probe identification signal may be provided in the same known manner as that used for Renishaw™-type touch probes. The connection number 11 is designated as being for a main power supply. Unspecified connections may be used for various ground or shield connections, in various embodiments. In various embodiments that use the I²C serial data control protocol, the decoder portion 48 (or 48') shown and described herein, may comprise a decoder compatible with the I²C protocol.

Figure 9:
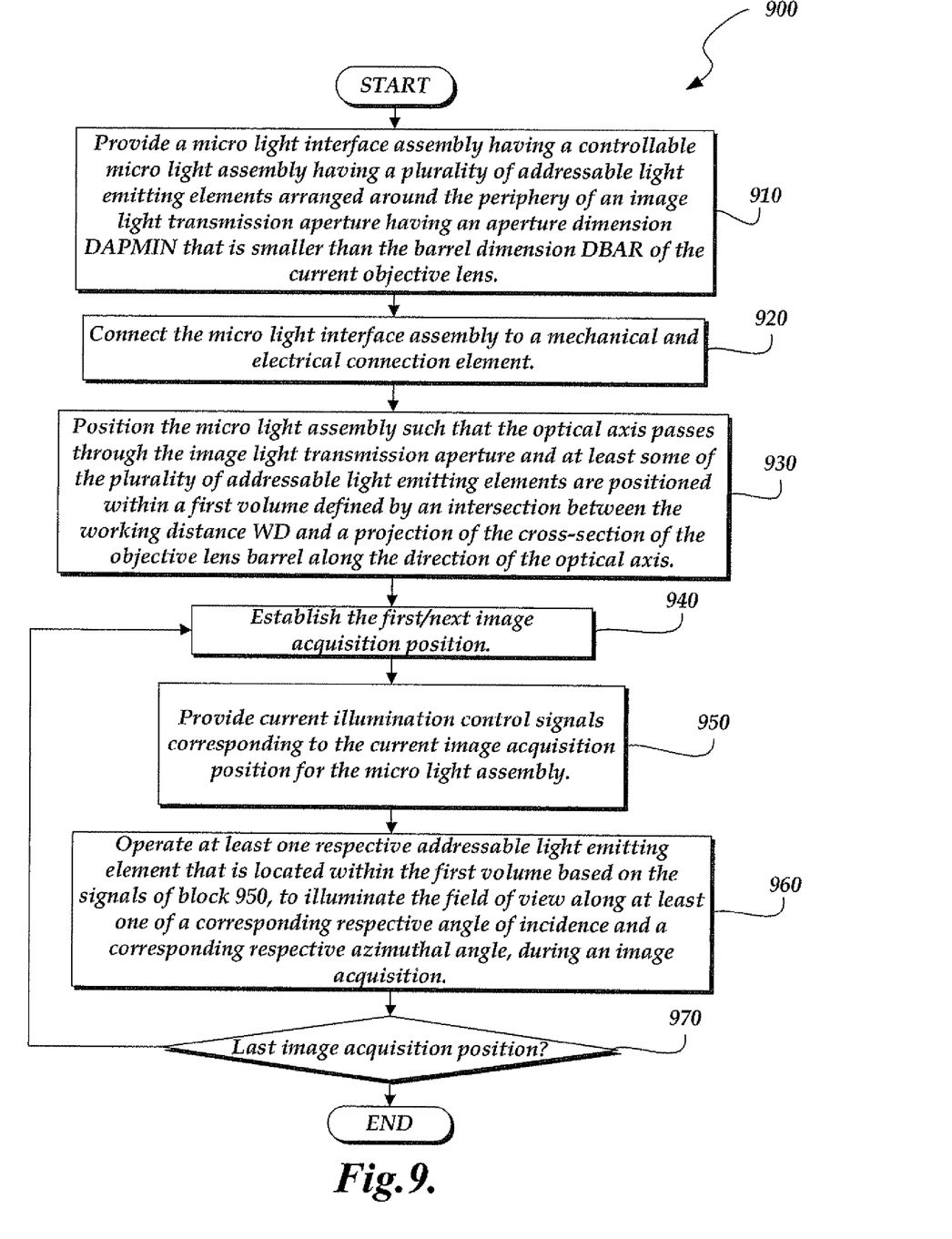
FIG. 9 is a flow diagram illustrating one exemplary embodiment of a routine for operating a micro light assembly in accordance with the present invention.

FIG. 9 is a flow diagram illustrating one exemplary embodiment of a routine 900 for operating a micro light assembly in accordance with the present invention. The routine may be implemented under manual control, or in control instructions provided during learn mode operations of a machine vision inspection system, or in automatic control instructions provided by a machine vision inspection system part program, for example. The routine starts, and at a block 910 a micro light interface assembly is provided, having a controllable micro light assembly having a plurality of addressable light emitting elements arranged around the periphery of an image light transmission aperture having a minimum aperture dimension DAPMIN that is smaller than the barrel outer dimension DBAR of a current objective lens. The micro light assembly is generally be selected to be compatible with the current objective lens (e.g., with a compatible aperture size and illumination distance ID, as outlined previously with reference to FIG. 4). At a block 920, the micro light interface assembly (e.g., the micro light interface assembly 40) is manually, semi-automatically, or automatically connected to a mechanical and electrical connection element (e.g., the autojoint connection 44' or the connection joint 539). At a block 930, the micro light assembly is positioned such that the optical axis of the objective lens passes through the image light transmission aperture and at least some of the plurality of addressable light emitting elements are positioned within a first volume defined by an intersection between the working distance WD of the objective lens and a projection of the cross-section of the objective lens barrel along the direction of the optical axis. At such an operating position the addressable light emitting elements may generally be arranged at close proximity (e.g., as close as is practical) to a field of view of the objective lens. At a block 940, the first/next image acquisition position is established (e.g., a desired workpiece feature is positioned in the field of view of the objective lens). At a block 950, for the current image acquisition position, current illumination control signals corresponding to the current image acquisition position are provided for the micro light assembly. At a block 960, at least one respective addressable element of the micro light assembly that is located within the first volume is operated based on the signals of block 950, to illuminate the field of view along at least one of a corresponding respective angle of incidence and a corresponding respective azimuthal angle, during an image acquisition. At a block 970, if the current image acquisition position is not the last image acquisition position, then the routine returns to block 940, otherwise, the routine ends.

It should be appreciated that the embodiments described above are exemplary only, and not limiting. Regarding the use of a touch probe system or other components to move and/or remove and replace a micro light interface assembly according to this invention, it will be appreciated that in various embodiments, such a system (or a functionally analogous system), may be provided for use solely with a micro light interface assembly. A touch probe need not be used in a system according to this invention, although it may be convenient to do so, in various embodiments. In some embodiments, a micro light interface assembly according to this invention may be permanently or semi-permanently mounted to a touch probe system or other components. Using a motion control system it may be moved to various desired positions, and/or retracted, to facilitate objective lens replacement or workpiece positioning operations. In such a case, various features which allow the micro light interface assembly to be readily attached and removed may be omitted and/or replaced with appropriate permanent or semi-permanent features.

Regarding micro light interface assemblies, in one alternate embodiment, a micro light interface assembly may include a controllable miniature mechanical system that may be used to provide additional degrees of freedom for positioning the micro light assembly. In one alternate embodiment, the micro light assembly may have its own cable or optical fiber connections and/or local control electronics proximate to the illumination array, and/or may be wirelessly controlled. In another embodiment, the micro light assembly may include a controllable micro-motor, memory-metal element, or the like that is used to configure moving elements of the micro light assembly, or deform it, to provide a desired lighting angle of incidence, or the like. In still other embodiments, some micro light assemblies may include a mirrored surface or beam splitter proximate to the aperture in the working distance between the objective lens and the micro light assembly, which may be used to deflect the optical axis (the imaging axis). In such embodiments, the micro light assembly may be rotated to various angles to illuminate and provide images of workpieces surface that are at a significant angle relative to the XY plane.

In various embodiments, if the illumination intensity is sufficient, light collection and/or deflection elements such as Fresnel lens or the like may be omitted in various embodiments. In such embodiments, the angle of incidence and/or azimuthal angle may be governed solely by the geometric relationship (e.g., the positioning) between an individual addressable light emitting element and optical axis and field of view. In other embodiments, the array substrate can have a non-planar form, such as cylinder or a part thereof, part of a toroid, or a partial-hemisphere, or the like, and an array of LED chips or other addressable lighting elements may be attached to such forms. Such forms may not require a Fresnel lens or the like, in various embodiments. In other embodiments, as an alternative to, or in addition to, a Fresnel lens or other macroscopic lens, an array of suitably designed micro lenses may be positioned over the illumination array, to individually focus and/or deflect the light from each illumination element to a desired direction.

Thus, while the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The embodiments of the invention in which an exclusive property or privilege is claimed are defined as follows:

1. A method for providing illumination for a microscopic machine vision inspection system, the microscopic machine vision inspection system comprising a connection element that mechanically receives and holds a micro light interface assembly and that electrically connects to the micro light interface assembly, and an imaging system including an objective lens comprising an objective lens barrel, wherein the objective lens has an outer dimension DBAR across a cross-section of the objective lens barrel approximately perpendicular to an optical axis of the objective lens, and the objective lens has a working distance WD between an end of the objective lens barrel and a plane of best focus, the method comprising:

providing a micro light interface assembly including a micro light assembly comprising a plurality of addressable light emitting elements arranged around at least a portion of the periphery of an image light transmission aperture having a minimum aperture dimension DAPMIN that is smaller than the outer dimension DBAR of the objective lens, wherein the dimension DAPMIN is the diameter of an inscribed circle that is fit to the boundary of the image light transmission aperture;

connecting the micro light interface assembly to the connection element mechanically and electrically;

positioning the micro light assembly such that the optical axis passes through the image light transmission aperture and at least some of the plurality of addressable light emitting elements are positioned within a first volume defined by an intersection between the working distance WD and a projection of the cross section of the objective lens barrel along the direction of the optical axis; and     controlling the micro light assembly such that at least one respective addressable light emitting element that is located within the first volume is selected and operated to illuminate a field of view of the imaging system at the plane of best focus along at least one of a corresponding respective angle of incidence relative to the optical axis and a corresponding respective azimuthal angle about the optical axis.

2. The method of claim 1, wherein the plurality of addressable light emitting elements comprises at least four addressable light emitting elements, and the step of positioning the micro light assembly comprises positioning at least four addressable light emitting elements within the first volume such that they are distributed over an azimuthal angle range of at least 180 degrees about the optical axis.

3. The method of claim 2, wherein the step of positioning the micro light assembly comprises positioning at least four addressable light emitting elements within the first volume such that they are distributed over an azimuthal angle range of at least 270 degrees about the optical axis.

4. The method of claim 3, wherein positioning the micro light assembly comprises locating all of the image light transmission aperture within the first volume.

5. The method of claim 4, wherein the minimum aperture dimension DAPMIN is at most 10 millimeters.

6. The method of claim 5, wherein the minimum aperture dimension DAPMIN is at most 6 millimeters.

7. The method of claim 6, wherein the minimum aperture dimension DAPMIN is at most 3 millimeters.

8. The method of claim 2, wherein in the step of providing a micro light interface assembly, at least four addressable light emitting elements are arranged to emit light within a distance of 3 millimeters from an edge of the image light transmission aperture.

9. The method of claim 2, wherein the step of positioning the micro light assembly comprises positioning the at least four addressable light emitting elements within the first volume at a distance of at most (0.75*WD) away from the plane of best focus along the direction of the optical axis.

10. The method of claim 9, wherein the step of positioning the micro light assembly comprises positioning the at least four addressable light emitting elements within the first volume at a distance of at most (0.5*WD) away from the plane of best focus along the direction of the optical axis.

11. The method of claim 2, wherein the step of positioning the micro light assembly comprises positioning the at least four addressable light emitting elements within the first volume at a distance of at most 5 millimeters away from the plane of best focus along the direction of the optical axis.

12. The method of claim 11, wherein the step of positioning the micro light assembly comprises positioning the at least four addressable light emitting elements within the first volume at a distance of at most 3 millimeters away from the plane of best focus along the direction of the optical axis.

13. The method of claim 2, wherein the objective lens comprises a lens element that has an outer dimension DLENS across a cross section of the lens element approximately perpendicular to an optical axis of the objective lens, and in the step of providing a micro light interface assembly the minimum aperture dimension DAPMIN is smaller than the outer dimension DLENS.

14. The method of claim 13, wherein the step of positioning the micro light assembly further comprises positioning the at least four addressable light emitting elements within a second volume contained within the first volume, the second volume defined by an intersection between the working distance WD and a projection of the cross section of the lens element along the direction of the optical axis.

15. The method of claim 1, wherein:

in the step of providing the micro light interface assembly the micro light assembly comprises a relatively planar portion that includes the plurality of addressable light emitting elements and the image light transmission aperture, and the relatively planar portion has an overall thickness along the direction of the optical axis of at most 3 millimeters.

16. The method of claim 15, wherein each of the addressable light emitting elements comprise an organic LED.

17. The method of claim 1, wherein:

the microscopic machine vision inspection system further comprises a motion control system, and     in the step of connecting the micro light interface assembly to the connection element mechanically and electrically, the micro light interface assembly is connected to the connection element by moving at least one of the micro light interface assembly and the connection element using the motion control system.

18. The method of claim 17, wherein the connection element comprises a touch probe head autojoint connection element.

19. The method of claim 18, wherein the microscopic machine vision inspection system further comprises a touch probe, and the method further comprises:

disconnecting the micro light interface assembly from the connection element mechanically and electrically, wherein disconnecting the micro light interface assembly comprises moving at least one of the micro light interface assembly and the connection element using the motion control system; and     connecting the touch probe to the connection element mechanically and electrically, wherein connecting the touch probe comprises moving at least one of the touch probe head and the connection element using the motion control system.

20. The method of claim 17, wherein the step of positioning the micro light assembly comprises using the motion control system to adjust the position of the micro light assembly relative to the first volume.

21. The method of claim 17, wherein the microscopic machine vision inspection system further comprises a tool rack operable to hold at least one micro light interface assembly, and the method further comprises:

holding the micro light interface assembly in the tool rack; and in the step of connecting the micro light interface assembly to the connection element mechanically and electrically, the micro light interface assembly is connected to the connection element while the micro light interface assembly is held in the tool rack.

22. A micro light interface assembly for providing illumination for a microscopic machine vision inspection system, the microscopic machine vision inspection system comprising a connection element that mechanically receives and holds the micro light interface assembly and that electrically connects to the micro light interface assembly, the micro light interface assembly comprising:

a micro light assembly comprising:

a substrate including an image light transmission aperture having a minimum aperture dimension DAPMIN that is at most 10 millimeters, wherein the dimension DAPMIN is the diameter of an inscribed circle that is fit to the boundary of the image light transmission aperture; and a plurality of addressable light emitting elements located on the substrate and distributed around at least a portion of a periphery of the image light transmission aperture, including at least four addressable light emitting elements arranged to emit light within a distance of 3 millimeters from an edge of the image light transmission aperture, the at least four addressable light emitting elements furthermore distributed over an azimuthal range of at least 180 degrees about an axis extending through the center of the inscribed circle that is fit to the image light transmission aperture;

mechanical and electrical interface features that connect to the connection element mechanically and electrically; and an interface circuit configured to receive control signals through the electrical interface features of the connection element and to control each of the addressable light emitting elements to illuminate a field of view located proximate to the image light transmission aperture along at least one of a corresponding respective angle of incidence and a corresponding respective azimuthal angle.

23. The method of claim 22, wherein the micro light assembly includes a relatively planar portion that includes the plurality of addressable light emitting elements and the image light transmission aperture, and the relatively planar portion has an overall thickness along a direction normal to its plane that is at most 3 millimeters.

24. The method of claim 22, wherein the mechanical and electrical interface features are configured to connect to a connection element that comprises a touch probe head autojoint connection element.

* * * * *